(No Model.)
R. HASSON.
COMBINED CULTIVATOR AND PLANTER.
No. 486,712. Patented Nov. 22, 1892.
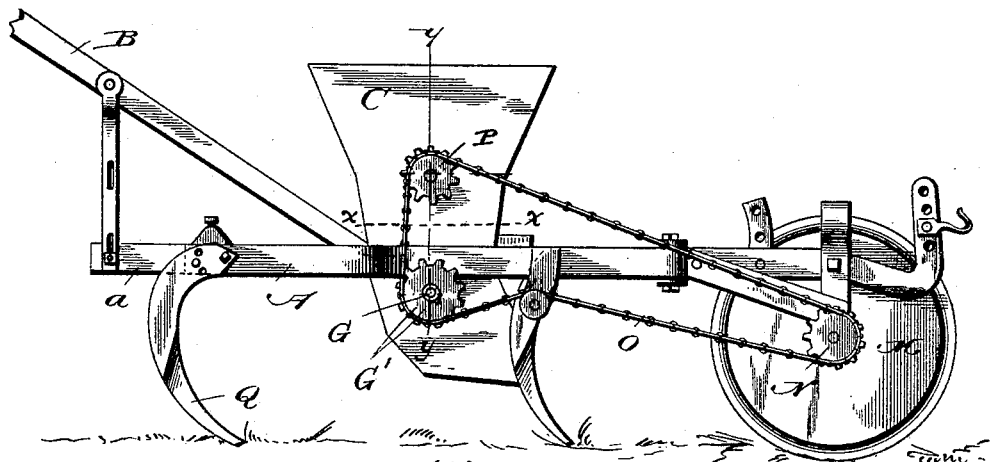
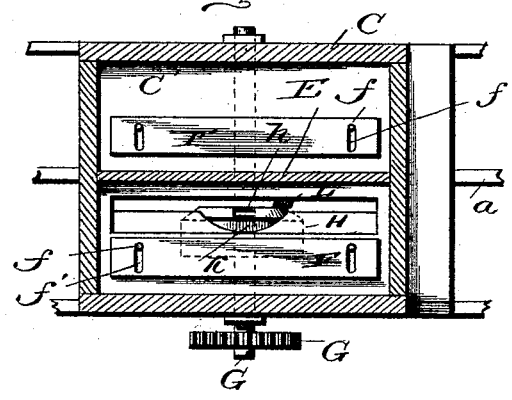
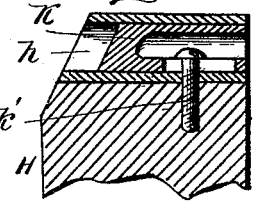
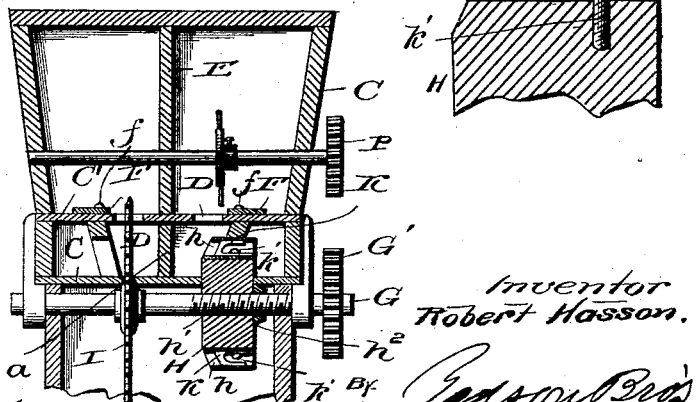
Witnesses:
Inventor
Robert Hasson.

UNITED STATES PATENT OFFICE.

ROBERT HASSON, OF GADSDEN, ALABAMA.

COMBINED CULTIVATOR AND PLANTER.

SPECIFICATION forming part of Letters Patent No. 486,712, dated November 22, 1892.

Application filed June 16, 1892. Serial No. 436,927. (No model.)

*To all whom it may concern:*

Be it known that I, ROBERT HASSON, a citizen of the United States, residing at Gadsden, in the county of Etowah and State of Alabama, have invented certain new and useful Improvements in a Combined Cultivator and Planter; and I do hereby declare the following to be a full, clear, and exact description of the invention, such as will enable others skilled in the art to which it appertains to make and use the same.

My invention relates to improvements in combined planters and cultivators; and the primary object is to provide a planter which can be readily attached to any well-known form of cultivator; and a further object is to provide mechanism adapted to plant different kinds of seeds, &c., and at any desired distance apart.

With these ends in view my invention consists in the combination, with a cultivator, of a hopper supported on the frame of the cultivator and provided in its bottom with adjustable feed-regulating plates, a shaft journaled in bearings on the hopper, a vertical feed-disk provided with a series of radial cups, and means for rotating the shaft and feed-disk as the cultivator is drawn over the field.

My invention further consists in the peculiar construction of the feed-disk and in the combination and arrangement of parts, as will be hereinafter fully pointed out and claimed.

In the accompanying drawings, Figure 1 is a side elevation of my combined planter and cultivator. Fig. 2 is a horizontal sectional view through the hopper on the line $x$ $x$ of Fig. 1. Fig. 3 is a transverse vertical sectional view on the line $y$ $y$ of Fig. 1. Fig. 4 is an enlarged detail sectional view.

Like letters of reference denote corresponding parts in the several figures of the drawings, referring to which—

A designates the frame of the cultivator, having the central main beam $a$, and B B are the handles thereof.

On the cultivator-frame is mounted a hopper C, which is supported and held in position by the beam A, extending through the front and rear wall of the hopper C. Above the bottom of the hopper C is arranged a false bottom C', in which are formed the longitudinal slots D D, and this hopper is divided into two compartments or chambers by a vertical longitudinal partition E. The slots D in the false bottom of each compartment of the hopper C are adapted to be covered by means of laterally-movable feed-slides or cut-offs F, and said slides are attached to the false bottom C' by means of screws or bolts $f$, which extend through slots $f'$, formed in said slides, and by loosening said screws or bolts the plates or slides F can be adjusted to expose more or less of the slots D. In bearings attached to the sides of the hopper C is journaled a transverse shaft G, on one end of which is rigidly secured a sprocket G'. The shaft G extends below the hopper C, and on said shaft is secured a feed-disk H, which extends vertically through the bottom of the hopper C, and in the periphery of said vertical feed-disk is formed a series of radial cups $h$ $h$. The feed-disk is preferably secured on the shaft G in the manner shown in Fig. 3, in which the shaft is shown as provided with a threaded portion $h'$, the threads of which engage with the interiorly-threaded hub of the feed-disk. A nut $h^2$ is screwed on the shaft to hold the disk rigidly in place thereon. On the shaft G, I have also shown a toothed feed-wheel I, which works in the compartment formed between the bottom, the false bottom, and one side of the hopper C on the opposite side of the beam A of the cultivator from the compartment containing the disk H. This wheel is to be used in case it is desired to plant fertilizer with the grain, &c., the grain and fertilizer being kept in the different compartments of the hopper C. In case it is desired to plant the grain without fertilizer, the wheel I can be removed and another feed-disk similar to the disk H secured in its place on the shaft. By this means the planter can be used to plant two varieties or different kinds of grain at the same time, and by arranging the cups on the feed-disks in line with each other the two kinds of seeds to be planted can be deposited in the same hill. By changing the relative arrangement of the two disks, so that cups thereon are out of line with each other, the different kinds of seeds will be planted in alternate hills.

To regulate the distance between the hills and the number of grains to be planted in each hill, I have provided the feed-disks with a series of hollow plugs or stops K. These plugs are adapted to be fitted in the alternate cups of each feed-disk, and they are detachably secured to said feed-disk by means of set-screws $k'$. By this construction the size and number of the cups on the feed-disk can be easily regulated.

To the under side of the bottom of the hopper is attached a brush or scraper L, the free outer end of which bears closely against the side of the feed-disk.

To the axle of the colter M of the cultivator is attached a sprocket N, and this wheel is connected with the sprocket G' on the shaft G by means of a sprocket-chain O. If desired, the sprocket-chain O can be extended around a sprocket P, carried on one end of a shaft journaled in the side walls of the hopper and carrying a suitable agitator.

The grain when planted is covered by the shovels Q in the usual manner.

The operation and advantages of my improvements will be readily apparent to persons skilled in the art to which they relate from the foregoing description, taken in connection with the drawings.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of the same.

Having thus fully described my invention, what I claim as new, and desire to secure by Letters Patent, is—

1. The combination, with a cultivator-frame, of a hopper provided above its bottom C with a false slotted bottom C', an adjustable plate F, secured on said false bottom and adapted to vary the size of the slot therein, a shaft journaled below the hopper, a feed-disk mounted on said shaft and extending through the bottom of the hopper into the space or chamber formed between said bottom and the false bottom C', and means for rotating the shaft, substantially as described.

2. In a planter, the combination of a hopper mounted on a suitable frame, a shaft journaled below the hopper and provided with an intermediate threaded portion $h'$, a feed-disk having an interiorly-threaded hub fitted on and engaging with the threaded portion of the shaft, a nut $h^2$, fitted on the shaft and bearing closely against the feed-disk, and means for rotating the shaft, substantially as described.

3. In a planter, a feed-disk provided with a series of cups, a plug K, arranged in one or more of said cups and provided with a socket which opens through one end thereof, and a set-screw extending through a slot formed in one wall of said socket into the solid body of the feed-disk, substantially as and for the purpose described.

In testimony whereof I affix my signature in presence of two witnesses.

ROBERT HASSON.

Witnesses:
  G. W. WEBB,
  A. L. WOODLIFF.